(12) United States Patent
Lueders et al.

(10) Patent No.: US 8,196,390 B2
(45) Date of Patent: Jun. 12, 2012

(54) PROCEDURE AND DEVICE TO MONITOR AN EXHAUST GAS AFTER-TREATMENT SYSTEM

(75) Inventors: Hartmut Lueders, Oberstenfeld (DE); Christian Walz, Durmersheim (DE); Matthias Loehr, Steinheim/Hoepfigheim (DE)

(73) Assignee: Robert Bosch GmbH, Stuttgart (DE)

( * ) Notice: Subject to any disclaimer, the term of this patent is extended or adjusted under 35 U.S.C. 154(b) by 335 days.

(21) Appl. No.: 11/638,764

(22) Filed: Dec. 14, 2006

(65) Prior Publication Data

US 2007/0144151 A1 Jun. 28, 2007

(30) Foreign Application Priority Data

Dec. 23, 2005 (DE) .................. 10 2005 062 120

(51) Int. Cl.
*F01N 3/00* (2006.01)
(52) U.S. Cl. ................ 60/286; 60/274; 60/295; 60/301; 60/303
(58) Field of Classification Search .................. 60/274, 60/276, 277, 286, 295, 297, 301, 303
See application file for complete search history.

(56) References Cited

U.S. PATENT DOCUMENTS

| | | | | |
|---|---|---|---|---|
| 5,628,186 A * | 5/1997 | Schmelz | ...................... | 60/274 |
| 6,408,615 B1 * | 6/2002 | Hahn | .............................. | 60/274 |
| 6,427,439 B1 * | 8/2002 | Xu et al. | ........................ | 60/286 |
| 6,532,736 B2 * | 3/2003 | Hammerle et al. | ............. | 60/286 |
| 6,546,720 B2 * | 4/2003 | van Nieuwstadt | ............. | 60/286 |
| 6,742,326 B2 * | 6/2004 | Xu et al. | ........................ | 60/284 |
| 6,928,359 B2 * | 8/2005 | Xu et al. | ........................ | 701/102 |
| 6,928,806 B2 * | 8/2005 | Tennison et al. | ................ | 60/286 |
| 7,028,465 B2 * | 4/2006 | Ripper et al. | ................... | 60/286 |
| 7,093,427 B2 * | 8/2006 | van Nieuwstadt et al. | ..... | 60/286 |
| 7,320,781 B2 * | 1/2008 | Lambert et al. | ............ | 423/239.1 |
| 7,418,816 B2 * | 9/2008 | Upadhyay et al. | .............. | 60/285 |
| 2002/0182127 A1 | 12/2002 | Braun et al. | | |
| 2005/0282285 A1 | 12/2005 | Radhamohan et al. | | |
| 2006/0000202 A1 * | 1/2006 | Ripper et al. | ................... | 60/286 |
| 2007/0137181 A1 * | 6/2007 | Upadhyay et al. | .............. | 60/286 |

FOREIGN PATENT DOCUMENTS

| | | |
|---|---|---|
| DE | 195 36 571 A1 | 4/1997 |
| DE | 197 39 848 A1 | 3/1999 |
| DE | 101 39 142 A1 | 2/2003 |
| EP | 0 697 062 B1 | 2/1996 |
| EP | 1 024 254 A2 | 8/2000 |
| EP | 1 069 288 A2 | 1/2001 |
| JP | 11-512799 | 11/1999 |
| JP | 2002-4843 | 1/2002 |
| JP | 2004-190551 | 7/2004 |

OTHER PUBLICATIONS

Werner Weisweiler, "Elimination of Nitrogen Oxides from Oxygen-Containing Automotive Exhaust Gases", Chemistry Engineer Technology, vol. 72, Issue 5, pp. 441-449, 2000.

* cited by examiner

*Primary Examiner* — Binh Q Tran
(74) *Attorney, Agent, or Firm* — Merchant & Gould P.C.

(57) ABSTRACT

Methods and devices to monitor an exhaust gas after-treatment system of an internal combustion engine with a motor block and an exhaust gas duct. The engine has at least one catalytic converter, upstream from which a reagent substance necessary for the $NO_x$ reduction in the catalytic converter is introduced by means of an introduction device. The reduction agent rate is increased to such an extent at defined reference operating points until an ammonia breach is detected in direction of flow behind the catalytic converter by means of an ammonia sensitive sensor in the exhaust gas duct.

8 Claims, 1 Drawing Sheet

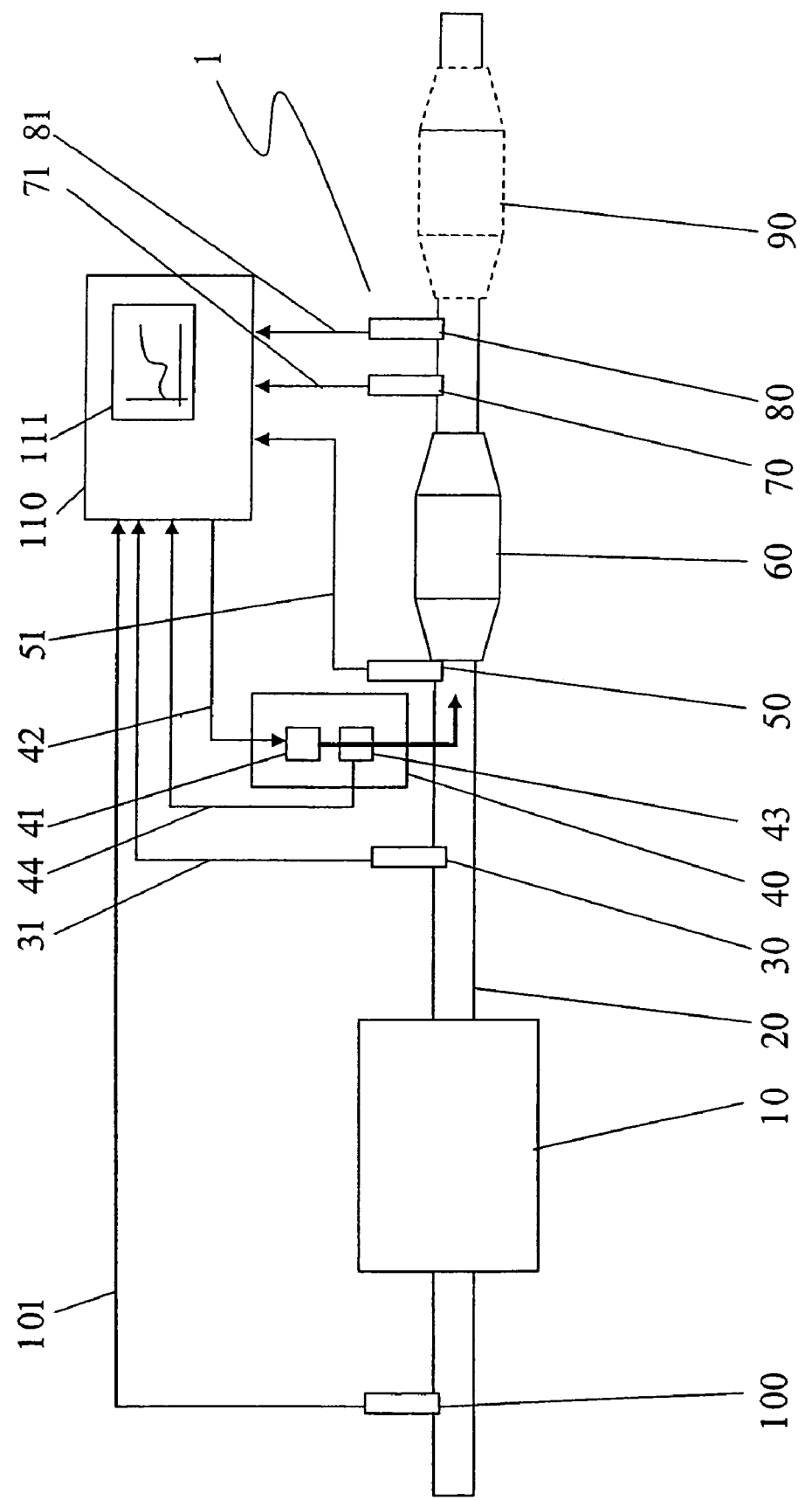

PROCEDURE AND DEVICE TO MONITOR AN EXHAUST GAS AFTER-TREATMENT SYSTEM

BACKGROUND

In connection with future legal specifications with regard to the nitrogen emissions of motor vehicles, a corresponding exhaust gas treatment is required. In order to reduce the $NO_x$ emission ($NO_x$ removal) of internal combustion engines, especially diesel engines with chronologically predominant lean, i.e. oxygen rich, exhaust gas, the so called selective catalytic reduction (SCR) process can be deployed. In this process a defined amount of a selectively active reduction agent is added to the exhaust gas. This can, for example, be in the form of ammonia, which is metered directly as a gas, or can also be derived from a precursor substance in the form of urea or from a urea-water-solution (HWL).

In the German patent DE 10139142 A1 an emission control system of an internal combustion engine is, for example, described, in which an SCR catalytic converter is deployed to reduce the NO emission which reduces the nitro en oxides contained in the exhaust as to nitrogen with the reagent substance ammonia. The ammonia is derived from a urea-water-solution (HWL) in a hydrolysis catalytic converter disposed upstream in front of the SCR-catalytic converter. The hydrolysis catalytic converter converts the urea contained in the HWL to ammonia and carbon dioxide. In a second step the ammonia reduces the nitrogen oxides to nitrogen, whereby water is produced as a byproduct. The exact mechanism has been adequately described in the trade literature (cf. WEISSWELLER in CIT (72), pages 441-449, 2000). The HWL is supplied in a reagent substance tank.

In the German patent DE 19739848 A1 a procedural approach is described, with which the NO emissions of the internal combustion engine before the catalytic converter can be calculated at least approximately from known operating parameters. The point of origin is an engine characteristic map, which is constructed from the load and rotational speed of the internal combustion engine. Additionally, provision can be made for corrections, for example, as a function of the air number lambda.

From the patent EP 1024254 A2 an exhaust gas treatment system of an internal combustion engine is made known, in which an SCR-catalytic converter is likewise deployed to reduce the $NO_x$ emissions. Provision is made again for ammonia to be the reagent substance which is derived from a urea-water-solution (HWL) in the exhaust gas tract. The reagent substance rate is established using the amount of fuel injected, the engine rotational speed as well as using at least one parameter of the exhaust gas, for example, the exhaust gas temperature.

In the patent EP 697062 B1 a procedure and a mechanism are described for the controlled introduction of a reagent substance into an exhaust gas containing nitrogen oxide. Provision is likewise made for a SCR-catalytic converter, which requires ammonia as a reagent substance, which is derived from a reagent substance introduced into the exhaust gas tract upstream from the SCR-catalytic converter. At least one parameter of the exhaust gas relevant to the operation, at least one parameter of a catalytic converter relevant to the operation and if need be a parameter of the internal combustion engine relevant to the operation are acquired to determine the $NO_x$ emissions before the catalytic converter of the internal combustion engine. Corresponding to the $NO_x$ emissions before the catalytic converter, an intermediate value is determined for a reagent substance rate to be specified. This intermediate value is reduced by a reagent substance rate desorbed by the catalytic converter or increased by a reagent substance rate adsorbed by the catalytic converter.

This characteristic of the SCR-catalytic converter, to be able to at least partially store ammonia, can or must be used depending upon catalytic converter type and metering strategy in order to optimize the $NO_x$ conversion rates. Additionally, the ammonia storage capability must be known in order to avoid ammonia breaches, as they can occur during dramatic temperature increases. The background for that is that with increasing temperature the ammonia storage capacity of the catalytic converter sinks. An uncontrolled release of stored ammonia resulting from this leads to offensive smells. To monitor an ammonia breach, ammonia sensors are meanwhile known in context with SCR-catalytic converters. On the basis of zeolite layers, these sensors change their electrical conductivity with the ammonia concentration in the gas surrounding them.

As a rule the ammonia storage capability of a catalytic converter is known when new and can be deposited in a liquid level characteristic curve as a function of temperature. The reduction of the ammonia storage capability with the life of the system (deterioration) is, however, not known.

It is, therefore, the task of the invention, to provide a procedure to monitor the performance capability of a catalytic converter, especially its capability to store reduction agents.

It is additionally the task of the invention, to provide a corresponding device.

SUMMARY

The task which concerns the procedure is thereby solved, in that the reduction agent rate at defined reference operating points is so greatly increased until an ammonia breach is detected by means of an ammonia sensitive sensor in the exhaust gas duct in the direction of flow behind the catalytic converter. For this reason large $NO_x$ conversions can be achieved in the catalytic converter with regard to an optimized metering strategy of the reduction agents because the storage capability of ammonia in the catalytic converter can be taken into account with this procedural approach. For this reason, the consumption of reduction agents is perspicuously reduced. Simultaneously with the procedure a minimized ammonia slip is guaranteed, which is especially advantageous for a rating in the new exhaust gas standards EU V.

The invention concerns a procedure to monitor an exhaust gas after-treatment system of an internal combustion engine with a motor block and exhaust gas ducts. The engine has at least one catalytic converter, upstream from which a reagent substance needed for $NO_x$ reduction in the catalytic converter is introduced by an introduction device.

The invention additionally concerns a device to monitor the exhaust gas after-treatment system of an internal combustion engine with a motor block and at least one exhaust gas duct, which has at least one $NO_x$ sensor to determine the $NO_x$ content in the exhaust gas and at least one catalytic converter, upstream from which a reagent substance needed for $NO_x$ reduction is introduced by an introduction device, whereby the $NO_x$ sensor as well as additional sensors to measure the temperature at the catalytic converter, to measure the air in the delivery air duct as well as an ammonia sensitive sensor in the direction of flow behind the catalytic converter maintain an active connection with a monitoring unit.

In connection with future legal specifications with regard to the nitrogen emissions of motor vehicles, a corresponding exhaust gas treatment is required. In order to reduce the $NO_x$ emission (NO$_x$ removal) of internal combustion engines, especially diesel engines, with chronologically predominant lean, i.e. oxygen rich, exhaust gas, the so called selective catalytic reduction (SCR) process can be deployed. In this process a defined amount of a selectively active reduction agent is added to the exhaust gas. This can, for example, be in the form of ammonia, which is metered directly as a gas, or can also be derived from a precursor substance in the form of urea or from a urea-water-solution (HWL).

A current maximum ammonia storage capability for this operating point can be especially effectively calculated from the amount of increase in the reduction substance rate up to the ammonia breach and with the aid of additional operating parameters of the exhaust gas after-treatment system.

The ammonia storage capability can be especially accurately calculated if a temperature progression at the catalytic converter and/or a NO$_x$ amount calculated from an air mass and a NO$_x$ concentration and/or a NO$_x$ conversion in the catalytic converter and/or an ammonia level at the beginning of the test and/or an amount of the reduction agent supplied during the regeneration, which is determined by way of a measuring mechanism attached to the introduction device, are used to calculate the ammonia storage capability.

Provision is made in a preferred variation of the procedure to ascertain a correction in the liquid level characteristic curve from the current ammonia storage capability. This correction is stored until the next test. In so doing, the metering strategy of the reduction agent is always based upon actual values of the ammonia storage capability.

If the implementation of the testing of the ammonia storage capabilities occurs in regular intervals and/or at favorable operating points, an actual value for the ammonia storage capability is always thereby available, which intervenes in the current metering strategy. Additionally, a conclusion can be made about an errant function of the system from the progression of this value.

In a preferred application of the procedure, the procedure is deployed in combined or integrated exhaust gas systems, in which a sooty particle filtering by means of a particle filter is additionally implemented. First of all an optimized NO$_x$ reduction can thereby be achieved, and at the same time a fine particle stress on the environment can be greatly reduced. Stricter exhaust gas standards, like EU V, can be met with these so-called SCR/DPF systems. The term DPF stands in this case for diesel particle filter.

To regenerate the particle filter, which is required in regular intervals, first the ammonia storage is emptied before the process and filled again at the conclusion of the regeneration. It is thereby assured, that uncontrolled ammonia breaches are avoided due to the high temperatures of the particle filter regeneration in the exhaust gas duct and also that no NO$_x$ can form from the ammonia, which otherwise can normally result at these high temperatures.

The task concerning the device is thereby solved, in that within the monitoring unit, an excess metering of the reagent substance can be initiated, an ammonia breach can be detected by means of an ammonia sensitive sensor and an ammonia storage capability for the catalytic converter can be determined. It can thereby be achieved, that changes due to deterioration of the ammonia storage capability in the catalytic converter can be detected and evaluated for an optimal metered addition of the reagent substance.

If the exhaust gas tract has a particle filter in the direction of flow behind the catalytic converter, these combined and integrated exhaust gas systems can as a result be implemented as they are known under the name of SCR/DPF systems.

If the current ammonia storage capability of the catalytic converter can be stored in a characteristic curve/engine characteristic map-unit within the monitoring unit, the advantage results thereby, that the ammonia storage capability of the catalytic converter can be also used for other closed-loop control and open-loop control functions in connection with the exhaust gas after-treatment.

In a preferred example of embodiment, the functions to determine the ammonia storage capability of the catalytic converter can be designed in the monitoring unit as software and/or hardware and at least partially as a component of a larger engine management system, whereby a function deposited as a program for the open-loop control of the metered addition of the reduction agent and/or to monitor the ammonia storage capability can rather simply be integrated as a subordinate program in the entire engine management system software. This also allows for cost effective software updates.

BRIEF DESCRIPTION OF THE DRAWINGS

The invention is more closely explained in the following description using one of the examples of embodiment depicted in the FIGURE.

FIG. 1 shows a schematic depiction of an exhaust gas after-treatment system of an internal combustion engine

DETAILED DESCRIPTION

FIG. 1 shows schematically a technical layout, in which a procedure according to the invention is operating.

An internal combustion engine 1 is depicted with a motor block 10 and an exhaust gas duct 20, which has a catalytic converter 60 and a NO$_x$ sensor 30 to determine the NO$_x$ content in the exhaust gas in front of the catalytic converter 60. The NO$_x$ sensor is connected via a signal line 31 to a monitoring unit 110. The catalytic converter 60 has a temperature sensor 50 to measure the temperature at the catalytic converter 60, which likewise is connected via a signal line 51 with the monitoring unit 110. In the example shown an additional NO$_x$ sensor 70 is disposed in the direction of flow after the catalytic converter within the exhaust gas duct. The NO$_x$ sensor 70 is connected via an additional signal line 71 with the monitoring unit 110. Provision is made additionally for an ammonia sensitive sensor 80 after the catalytic converter for the detection of ammonia in the exhaust gas. This sensor too is connected to the monitoring unit 110 via a signal line 81. Additionally, provision can be made as shown for an air sensor 100 in the delivery air duct. The amount of air, for example, can be determined with this sensor 100. For the purpose of evaluating the amount of air, the air sensor 100 is connected to the monitoring unit 110 via a signal line 101.

To reduce the NO$_x$ in the exhaust gas, provision is made for an introduction device 40 for a reduction agent located upstream from the catalytic converter. With regard to the reduction agent, gaseous ammonia is normally the agent of concern, which can be produced in a separate unit from a urea-water-solution (HWL); or the HWL itself is the agent of concern which can be directly injected into the exhaust gas duct 20 by way of a metering unit 41 integrated into the introduction device 40. Additionally, the introduction device 40 has a measuring device 43 in the form of a flow meter, which is connected to the monitoring unit 110 via a signal line 44. The amount of metered addition of the reduction agent can thereby be determined and evaluated at any time.

Provision is made according to the invention to intentionally initiate an excess metering of the reagent substance, to detect an ammonia breach by means of an ammonia sensitive sensor 80 and to determine an ammonia storage capability for the catalytic converter. Furthermore, in the example of embodiment depicted, provision is made for a characteristic curve-engine characteristic map-unit 111 in the monitoring unit 110, with which the current ammonia storage capability of the catalytic converter 60 can be stored in the monitoring unit 110 until the next determination occurs.

The function to determine the ammonia storage capability of the catalytic converter 60 is preferably executed as software or hardware in the monitoring unit 110 and is at least partially a component of a larger engine management system and can be correspondingly integrated into an On-Bord-Unit (OBU).

In a preferred application a particle filter 90 is additionally disposed in a combined integrated exhaust gas system (integrated SCR/DPF system) in the direction of flow behind the catalytic converter 60. In such exhaust gas systems the $NO_x$ content allows itself on the one hand to be reduced and simultaneously the sooty particles allow themselves to be filtered out, which is of particular interest in regard to the adherence to stricter exhaust gas standards for vehicles with diesel engines. The particle filter 90 must, however, be regenerated in certain time intervals. To perform the regeneration, elevated temperatures are produced in the exhaust gas duct 20 by targeted steps within the motor and/or fuel injection into the exhaust gas duct 20, so that the filtered soot in the particle filter 90 can burn off.

It is to be noted during regeneration of the particle filter, that the filter regeneration of the ammonia storage of the catalytic converter 60 must be emptied in order on the one hand to avoid an ammonia breach and on the other hand to prevent the formation of $NO_x$ from ammonia, which especially can occur at high temperatures. Such high temperatures can arise during regeneration. After conclusion of the regeneration phase, the ammonia storage in the catalytic converter must be filled again.

Provision is made initially in the procedure to determine the ammonia storage capability to increase the reduction agent rate to such an extent at defined reference operating points until an ammonia breach is detected by the ammonia sensitive sensor 80 in the exhaust gas duct 20 in the direction of flow behind the catalytic converter 60. This can occur in regular intervals and/or during favorable operating conditions at a defined reference operating point.

A current maximum ammonia storage capability for this operating point is calculated from the extent of the increase in the reduction agent rate up to the ammonia breach and with the aid of additional operating parameters of the exhaust gas after-treatment system. For this purpose the following parameters can be used to calculate the ammonia storage capability.

a temperature progression at the catalytic converter 60
    a $NO_x$ amount calculated from an air mass an a $NO_x$ concentration
    an $NO_x$ conversion in the catalytic converter 60
    an ammonia level at the beginning of the test and/or
    an amount of the reduction agent supplied during the regeneration Moreover, additional operating parameters of the internal combustion engine can be used for the calculation.

Provision is additionally made in the procedure to ascertain a correction of a liquid level characteristic curve, which is stored until the next test. This stored value delivers the basis for the current metering strategy.

In the combined and integrated exhaust gas systems with an additional particle filter 90, the ammonia storage is filled again as quickly as possible up to its maximum limit for the purpose of testing, respectively determining the ammonia storage capability after the conclusion of the particle filter regeneration. The liquid level limit is ascertained by the ammonia sensitive sensor 80. The ammonia storage capability can be calculated from the known operating and metering parameters, such as time, metered amount of the reduction agent, which can be determined by the measuring device 43, and temperature, respectively temperature progression. The value ascertained in this manner serves according to a plausibility test to correct the original liquid level characteristic curve of the ammonia storage capability.

An optimal metering of the reduction agent can occur with the device depicted and the described procedure. Changes due to deterioration of the ammonia storage capability of the catalytic converter 60 can be acquired at any time in the procedure and used for a metered addition as a correction. Especially in the integrated SCR/DPF systems for modern diesel internal combustion engines, stricter exhaust gas standards can be met with such a concept.

The invention claimed is:

1. A method of monitoring an exhaust gas after-treatment system of an internal combustion engine with a motor block and an exhaust system including an exhaust gas duct, a catalytic converter, an introduction device, and an ammonia sensor positioned in the exhaust gas duct in a direction of exhaust gas flow after the catalytic convertor, wherein the catalytic converter reduces $NO_x$ contained in exhaust gas with the aid of a reduction agent including ammonia or a reagent used to derive ammonia that is injected by the introduction device into the exhaust gas duct, the method comprising:

increasing a reduction agent metering rate at defined reference operating points until an intentionally induced ammonia breach of the catalytic convertor is detected by the ammonia sensor; and calculating a momentary maximum ammonia storage capacity of the catalytic convertor from a measure of the increase of the reduction agent metering rate up to the induced ammonia breach and additional operating parameters of the exhaust gas after-treatment system.

2. A method according to claim 1, wherein calculating the ammonia storage capability includes calculating based on a temperature progression at the catalytic converter, a $NO_x$ amount calculated from an air mass and a $NO_x$ concentration, a $NO_x$ conversion in the catalytic converter, an ammonia level at the beginning of the test, or an amount of the reduction agent supplied during the regeneration, which is determined by a measuring device attached to the introduction device.

3. A method according to claim 1, further comprising ascertaining a correction of a liquid level characteristic curve from a current ammonia storage capability.

4. A method according to claim 1, further comprising determining an ammonia storage capability of the catalytic converter by deploying a procedure in combined or integrated exhaust gas systems, in which a sooty particle filtering is additionally implemented by means of a particle filter.

5. A method according to claim 4, further comprising emptying the ammonia storage prior to the regeneration of the particle filter and filling the ammonia storage at the conclusion of the regeneration.

6. A device to monitor an exhaust gas after-treatment system of an internal combustion engine with a motor block and at least one exhaust gas duct, which has at least one $NO_x$ sensor to determine a $NO_x$ content in an exhaust gas and at least one catalytic converter upstream from which a reagent substance for $NO_x$ reduction in the catalytic converter is introduced with an introduction device, wherein the $NO_x$ sensor as well as additional sensors to measure a temperature at the catalytic converter and to measure an air in a delivery air duct as well as an ammonia sensor in a direction of exhaust gas flow after the catalytic converter maintain an active connection to a monitoring unit, wherein in the monitoring unit an excess metering of the reagent substance is initiated to intentionally induce an ammonia breach until detected with the ammonia sensor and an ammonia storage capability for the catalytic converter is determined, wherein within the monitoring unit, the current ammonia storage capability of the catalytic converter is stored in a characteristic curve/engine characteristic map-unit of the monitoring unit.

7. A device according to claim 6, wherein the exhaust gas duct has a particle filter in the direction of flow behind the catalytic converter.

8. A device according to claim 6, wherein a function to determine the ammonia storage capability of the catalytic converter in the monitoring unit is designed as at least one of software and hardware and is at least partially a component of a larger engine management system.

* * * * *

UNITED STATES PATENT AND TRADEMARK OFFICE
CERTIFICATE OF CORRECTION

PATENT NO.        : 8,196,390 B2
APPLICATION NO.   : 11/638764
DATED             : June 12, 2012
INVENTOR(S)       : Lueders et al.

It is certified that error appears in the above-identified patent and that said Letters Patent is hereby corrected as shown below:

Col. 1, lines 22-23: "reduce the NO emission, which reduces the nitro en oxides contained in the exhaust as to nitrogen" should read --reduce the $NO_x$ emission, which reduces the nitrogen oxides contained in the exhaust gas to nitrogen--

Col. 1, line 35: "which the NO emissions" should read --which the $NO_x$ emissions--

Col. 2, lines 47-64: The paragraphs starting with "The invention concerns" and "The invention additionally" should be deleted Col. 2, line 65 to Col. 3, line 10: The paragraph starting with "In connection with future" should be deleted.

Signed and Sealed this
Nineteenth Day of March, 2013

Teresa Stanek Rea
*Acting Director of the United States Patent and Trademark Office*